United States Patent [19]

Snyder et al.

[11] Patent Number: 5,719,376

[45] Date of Patent: Feb. 17, 1998

[54] METHOD FOR LASER HEATING A SURFACE FORMED BY A CIRCULAR BORE EXTENDING THROUGH A WORKPIECE

[75] Inventors: Craig L. Snyder, Glen Gardner, N.J.; William J. Gavigan, Nazareth, Pa.; Frank J. Tufano, Wilmington, N.C.; James T. Shandersky, Milan, Pa.

[73] Assignee: Ingersoll-Rand Company, Woodcliff Lake, N.J.

[21] Appl. No.: 751,490

[22] Filed: Nov. 18, 1996

[51] Int. Cl.$^6$ ................................................ B23K 26/00
[52] U.S. Cl. .......................... 219/121.85; 219/121.66; 148/565
[58] Field of Search ........................ 219/121.6, 121.65, 219/121.66, 121.74, 121.78, 121.8, 121.82, 121.84, 121.85; 148/512, 525, 565

[56] References Cited

U.S. PATENT DOCUMENTS

| | | | |
|---|---|---|---|
| 4,017,708 | 4/1977 | Engel et al. | 148/565 |
| 4,303,137 | 12/1981 | Fischer | 148/525 X |
| 4,365,136 | 12/1982 | Gottlieb | 219/121.65 |
| 4,539,461 | 9/1985 | Benedict et al. | 148/565 |
| 5,160,556 | 11/1992 | Hyde et al. | 148/525 |

FOREIGN PATENT DOCUMENTS

| | | | |
|---|---|---|---|
| 58-199821 | 11/1983 | Japan. | |
| 60-159122 | 8/1985 | Japan. | |
| 60-251222 | 12/1985 | Japan | 219/121.85 |
| 1-249285 | 10/1989 | Japan | 219/121.78 |
| 2-47221 | 2/1990 | Japan. | |

Primary Examiner—Teresa J. Walberg
Assistant Examiner—Gregory L. Mills
Attorney, Agent, or Firm—John J. Selko

[57] ABSTRACT

A a method for laser heating a surface formed by a circular bore extending in a workpiece along a longitudinal bore axis includes providing a holder for holding a workpiece; directing a laser beam into the workpiece bore; and providing a mirror in the workpiece bore for directing the laser beam against a portion of the surface to be heated. The workpiece is cooled adjacent the portion of the surface to be heated by the workpiece holder. The workpiece and mirror are moved relative to each other longitudinally back and forth along the workpiece bore axis and rotatably about the workpiece bore axis, to produce a preselected pattern of heated area on the workpiece bore surface.

14 Claims, 4 Drawing Sheets

METHOD FOR LASER HEATING A SURFACE FORMED BY A CIRCULAR BORE EXTENDING THROUGH A WORKPIECE

BACKGROUND OF THE INVENTION

This invention relates generally to heat treating a workpiece using a laser device, and more particularly to heat treating a surface of a workpiece, the surface to be heat treated being formed by a small diameter bore extending in the workpiece.

The manufacture of tightly toleranced small cylinders, many times with complex asymmetric thin-walled cross-sections and abrupt diameter changes, requiring a hardened ID surface can present formidable problems. The traditional approach requires the through-hardening or case hardening of a rough machined steel part via conventional means such as quench and temper, or carburizing, followed by difficult and multi step finish grinding. This approach is time consuming and expensive.

The foregoing illustrates limitations known to exist in present devices and methods for hardening internal surface of small diameter bores. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for laser heating a surface formed by a circular bore extending through a workpiece along a longitudinal bore axis comprising: providing a holder for holding a workpiece; directing a laser beam into a first end of said workpiece bore; providing optic means in said workpiece bore for directing said laser beam against a portion of said surface to be heated; cooling said workpiece adjacent said portion of said surface to be heated; moving said workpiece and said optic means relative to each other longitudinally back and forth along said workpiece bore axis; rotating said workpiece about said workpiece bore axis relative to said optic means; and controlling movement of said workpiece and said optic means to produce a preselected pattern of heated area on said workpiece bore surface.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
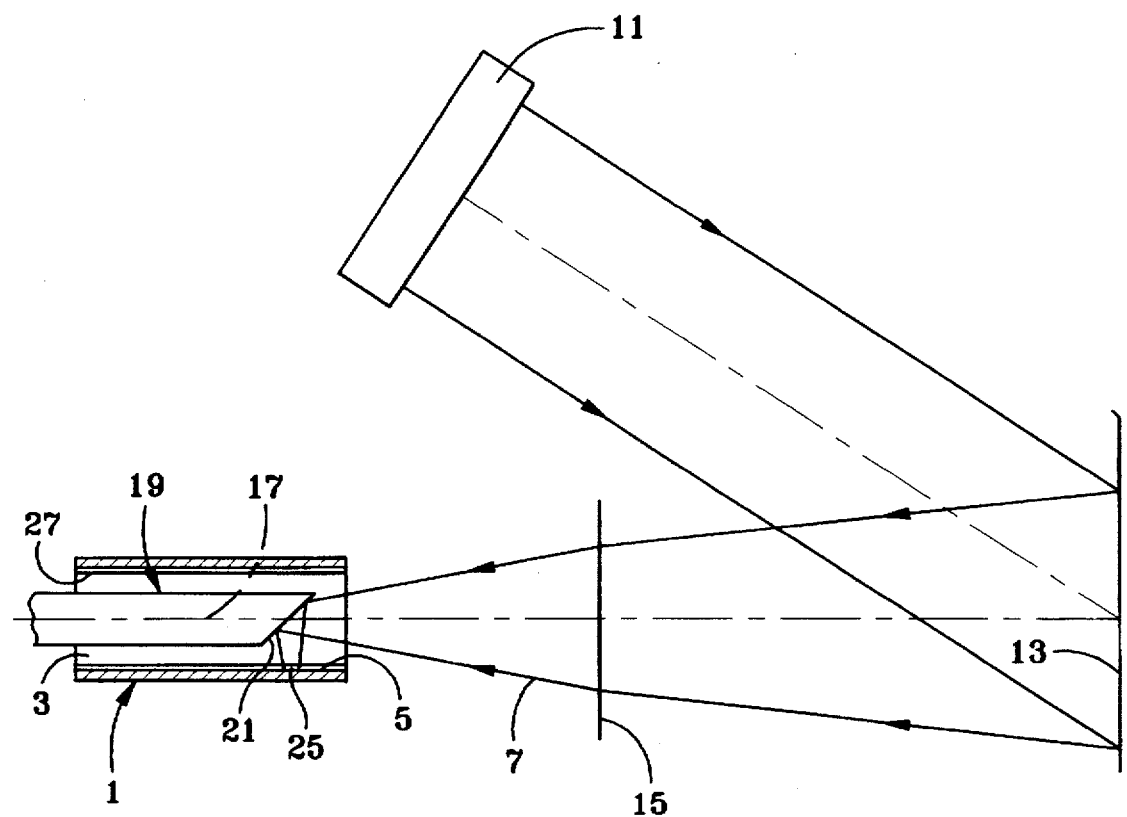
FIG. 1 is a schematic drawing showing a workpiece having a surface formed by a small diameter bore therethrough being heated by a laser, according to the invention.

FIG. 1 shows a workpiece 1 having a small diameter workpiece bore 3 therein forming a workpiece bore internal surface 5 to be heated by a laser beam 7 for a purpose such as hardening or other conventional heat-treatment purposes. Workpiece 1 is supported in a workpiece holder (not shown), to be described hereinafter. Beam 7 is generated by a laser 11 of conventional design. Laser beam 7 passes through a conventional beam integrator 13 for the purpose of shaping the beam 7 into a preselected geometric pattern having a preselected beam density. The choice of beam size and power density would be affected by factors including material to be heated, wall thickness, degree of heating, and final application to be satisfied. We have successfully used a square pattern, 3/16 inch×3/16 inch, with a density of 57 KW/square inch.

The integrator 13 is a model SI061 optical integrator supplied by Spawr Industries, Optics Division, of Lake Havasu, Ariz., and it is described in U.S. Pat. No. 4,195,913.

Beam 7 passes through a conventional lens 15 for the purpose of focusing the beam 7, as is well known.

Thereafter, beam 7 moves along longitudinal axis 17 of workpiece bore 3 and enters workpiece bore 3 to strike the optic means 19 of this invention. Optic means 19 includes a reflective mirror 21 positioned therein on a support member (not shown), to be described hereinbelow. Mirror 21 is inclined at an angle, preferably 45°, to workpiece bore axis 17 to cause beam 7 to strike workpiece internal surface 5 at an area 25 to be heat-treated. Mirror 21 is is a highly polished metallic molybdenum or tungsten member, to survive the laser beam heat. Workpiece internal surface 5 is coated with a layer 27 of absorptive material to convert laser beam 7 into heat energy.

As described hereinbelow, workpiece 1 and workpiece holder 2 are movable in relation to support member 17 and mirror 21 in an axial and rotational direction, to permit any portion of surface 5 to be impinged by beam 7.

Figure 2:
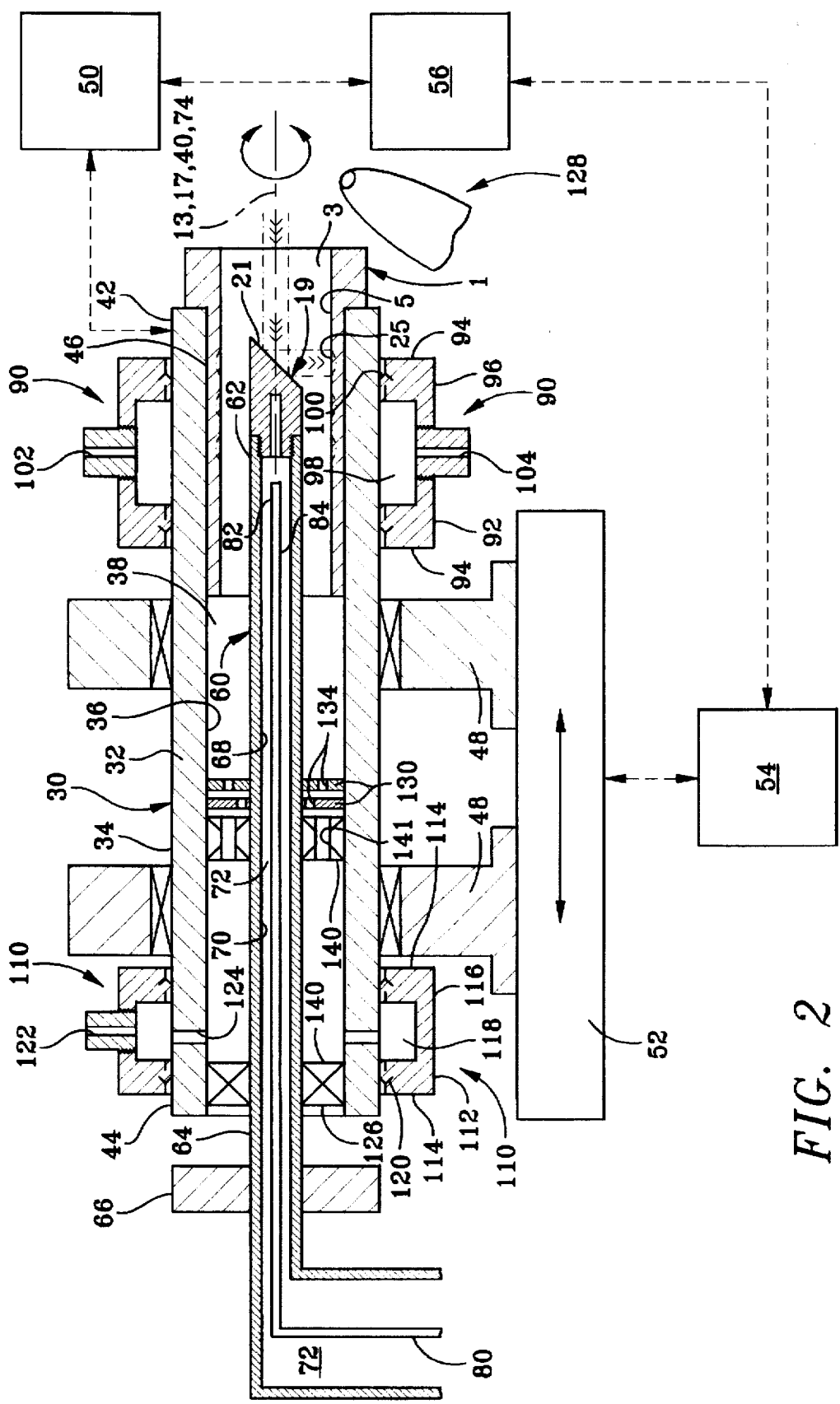
FIG. 2 is schematic, partially cross-sectional view of a laser device according to the invention, for heating a surface formed by a small diameter bore in a workpiece.
Figure 3:
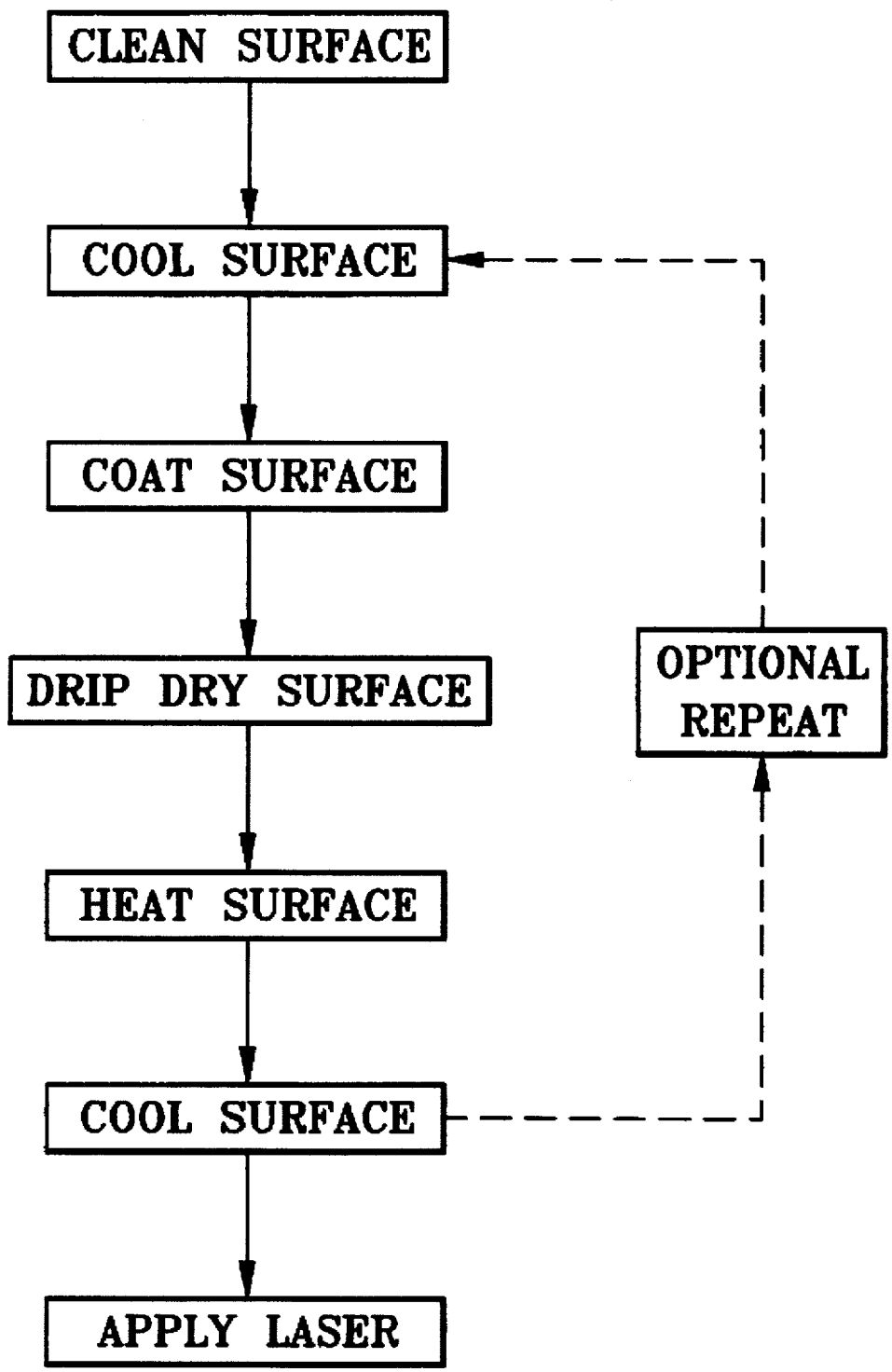
FIG. 3 is a schematic flow diagram for applying a coating to a surface formed by a small diameter bore in a workpiece prior to heating the surface according to the invention.

Now referring to FIG. 2, the device of the invention will be further described. Workpiece holder 30 comprises an elongated hollow tube 32 having an outer surface 34 and an inner surface 36, the inner surface 36 forming an enclosed passageway 38. Workpiece holder 30 extends along workpiece holder axis 40 that is coincident with workpiece bore axis 13, and terminates in an open first and second end 42,44, respectively. Workpiece holder inner surface 36 is adapted by shape and dimension to make substantially continuous contact against an outer surface 46 of workpiece 1, when workpiece 1 is positioned in passageway 38 with workpiece bore axis 13 coincident with workpiece holder axis 40. Workpiece holder passageway 38 and workpiece bore 3 form a continuous passageway along workpiece holder 30, through workpiece 1 and out first end 42 of workpiece holder 30.

Workpiece holder 30 is supported for rotation about workpiece holder axis 40 on a pair of spaced apart pillow block bearings 48. Actuation means for moving workpiece holder 30 includes a conventional combination of a motor and drive belt 50. Additionally, workpiece holder 30 is fixed to a table 52 that is movable back and forth parallel to workpiece holder axis 40 by motor 54. Simultaneous control of motors 50,54 is achieved with a conventional, numerically controlled computer device 56, as described more fully hereinbelow.

The optic means 19 includes the mirror 21 positioned in workpiece bore 3 spaced from workpiece bore internal surface 5 on a support member positioned in workpiece bore 3. The support member is an elongated, hollow stalk 60 having a first end 62 adapted to threadably receive mirror 21, and a second end 64 anchored on a fixed support member 66 outside of workpiece holder 30.

Cooling means for cooling the optic means 19 will now be described. Stalk 60 includes a stalk bore 68 with an internal stalk bore surface 70 forming an enclosed stalk passageway 72 that extends longitudinally along stalk bore axis 74 and terminates in first end 62 and second end 64. An elongated, hollow fluid inlet tube 80 extends longitudinally along stalk passageway 72 and terminates in an open end 82 adjacent to mirror 21 on first stalk end 62. Tube 80 forms a first passageway for carrying cooling fluid to mirror 21. Stalk bore internal surface 70 and external surface 84 of tube 80 form a second passageway for carrying fluid out of stalk bore 68 via second stalk end 64. Cooling fluid can be recirculated by conventional means (not shown) such as a pump and fluid storage tank, or used once and discharged.

Additional means for cooling the workpiece 1 will now be described. A first jacket 90 is positioned surrounding external surface 34 of workpiece holder 30, adjacent first end 42 thereof. First jacket 90 is a hollow housing 92 having a pair of spaced-apart sidewalls 94 extending radially outwardly with respect to workpiece external surface 34. Sidewalls 94 are positioned in close proximity to each other (preferably 4 inches apart). A cross member 96 connects sidewalls 94, whereby jacket 90 forms a U-shaped annular container defining three sides of an intermediate space 98 through which a cooling fluid (preferably water) flows. Intermediate space 98 contacts and is bounded by external surface 34 of workpiece holder 30. Each sidewall 94 is in sliding contact with external workpiece holder external surface 34, whereby workpiece holder 30 can rotate with respect to first jacket 90, which is independently supported by a support member (not shown). Seals 100 between each sidewall 94 and workpiece holder external surface 34 retain fluid in housing 92. Alternatively, first jacket 90 and sidewalls 94 could be fixed to workpiece holder 30 and rotate therewith, eliminating the need for seals 100. Entry port means 102 permits entry of fluid, and exit port means 104 permits exit of fluid. Cooling fluid can be recirculated by conventional means (not shown) such as a pump and fluid storage tank, or used once and discharged.

For high temperature applications, such as nitriding or carburizing, a gas shielding means must be provided to protect the surface area being heated from contamination and to reduce splatter of molten material. The gas shielding means will now be described. A second jacket 110 is positioned on external surface 34 of workpiece holder 30, adjacent second end 44 thereof. Second jacket 110 is a hollow housing 112 having a pair of spaced-apart sidewalls 114 extending radially outwardly with respect to workpiece external surface 34. Sidewalls 114 positioned in close proximity to each other (preferably about 2 inches apart). A cross- member 116 connects sidewalls 114, whereby jacket 110 forms a U-Shaped annular housing 112 defining three sides of an intermediate space 118 through which a shielding gas flows. Intermediate space 118 contacts and is bounded by external surface 34 of workpiece holder 30. Each sidewall 94 is in sliding contact with workpiece holder external surface 34, whereby workpiece holder 30 can rotate with respect to second jacket 110, which is independently supported by a support member (not shown). Seals 120 between each sidewall 114 and workpiece holder external surface 34 retain gas in housing 112. Alternatively, second jacket 110 and sidewalls 114 could be fixed to workpiece holder 30 and rotate therewith, eliminating the need for seals 120. Entry port means 122 permits entry of shielding gas under positive pressure into intermediate space 118, and aperture means 124 connects intermediate space 118 with workpiece holder internal passageway 38. Blocking means 126 closes off second end 44 of workpiece holder 30 to prevent shielding gas from exiting therethrough. A conventional vacuum suction means 128, such as a vented hood, is positioned adjacent first end 42 of workpiece holder 30 to draw vapors or smoke and debris caused by heating longitudinally through workpiece holder passageway 38, across area 25 being heated and out first end 42, along with shielding gas. Shielding gas can be selected from the group consisting essentially of argon, neon, xenon, helium and nitrogen, depending in large part upon the type of heating process to be achieved.

Reflection of laser beam light can occur during operation, resulting in passage of light along workpiece holder internal passageway 38 toward second end 44 of workpiece holder 30. To prevent this condition, laser light stop means are inserted in workpiece internal passageway 38 longitudinally positioned between mirror 21 and blocking means 126. Laser light stop means includes a plurality of spaced-apart annular graphite plugs 130, in close proximity to each other (preferably ¼ to ½ inch). Plugs 130 are positioned in workpiece internal passageway 38 transverse to workpiece holder axis 40. Each plug 130 has a plug bore having a longitudinal plug bore axis coincident with workpiece holder bore axis 40 and an annular outer plug perimeter surface. Each plug bore is connected to stalk 60, with outer perimeter surface slidably in contact against inner surface 38 of workpiece holder 30. Plugs 130 completely close workpiece holder passageway 38 surrounding stalk 60. Each plug 130 has a plurality of apertures 134 extending longitudinally therethrough to permit passage of shielding gas. Each aperture 134 of one plug 130 is offset, radially or axially, with respect to any aperture 134 in an adjacent plug, to prevent an aligned passageway for passage of light beams, while permitting flow of shielding gas.

The actuation means for longitudinally moving workpiece holder 30, with workpiece 1 therein, will now be further described. A plurality of spaced-apart support bearings 140 are positioned in workpiece holder passageway 38 transverse to workpiece holder bore axis 40. Each bearing 140 has a bearing bore with a longitudinal axis coincident with Workpiece holder bore axis 40. Each bearing 140 is attached to stalk 60 at its bearing bore. Each bearing 140 has an annular outer perimeter surface slidably in contact against inner surface 36 of workpiece holder 30. Workpiece holder 30 is longitudinally slidable and rotatable with respect to stalk 60. Alternatively, bearings 140 can have their outer surface fixed to workpiece holder internal surface 36 and their bearing bores slidable along stalk 60. Also, one bearing 140 can also serve as a blocking member 126 in the shielding gas shield means described hereinabove. A plurality of apertures 141 in bearing 140 (excluding a bearing 140 used as a blocking member 126) permits passage of shielding gas. Thus, it can be understood that workpiece holder 30 and workpiece 1 therein are movable longitudinally and rotationally with respect to mirror 21.

Figure 4:
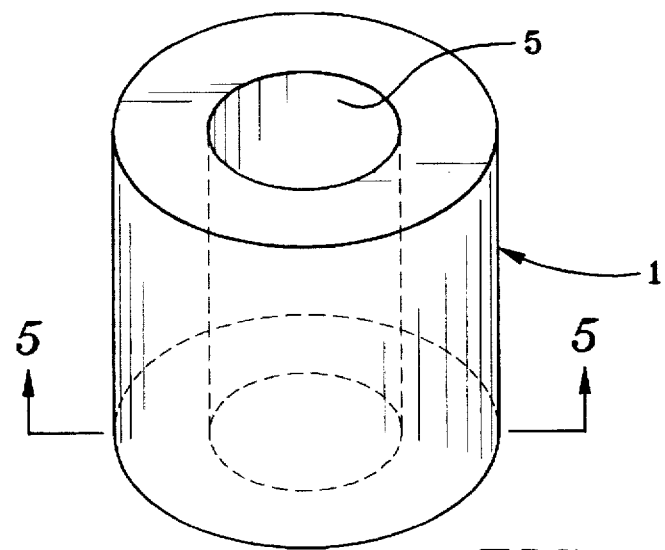
FIG. 4 is a perspective schematic view of a workpiece to be heated according to the invention.

Prior to heating a surface with a laser, it is conventional practice to coat the surface with an absorptive material that can convert the laser beam into heat energy to heat the surface. FIG. 4 shows a preferred method-of coating workpiece internal bore surface 5 of workpiece 1, prior to laser heating. Workpiece bore surface 5 is cleaned, preferably in a conventional ultrasonic cleaning device, to provide a surface that will accept a coating. The surface 5 is heated in ambient atmosphere in a furnace to about 185° F. for about 1 hour to remove moisture. Next, surface 5 is air cooled and thereafter dipped into a liquid carrier, preferably isopropanol, having dispersed herein finely ground absorptive particles, preferably graphite. The coated surface is drip dried and heated again in ambient atmosphere to about 185° F. for about 5 minutes to evaporate the carrier liquid, leaving a coating 27 on surface 5. If any portions of surface 5 are not covered, steps are repeated, including dipping, drip drying and reheating, until coating 27 completely covers surface 5.

Figure 5:
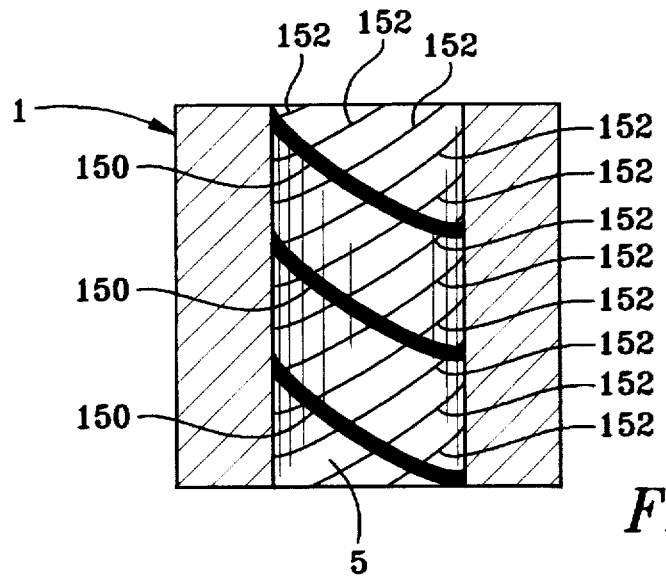
FIG. 5 is a view along A—A of FIG. 4 showing various heat affected zone patterns achieved according to the invention.
Figure 6:
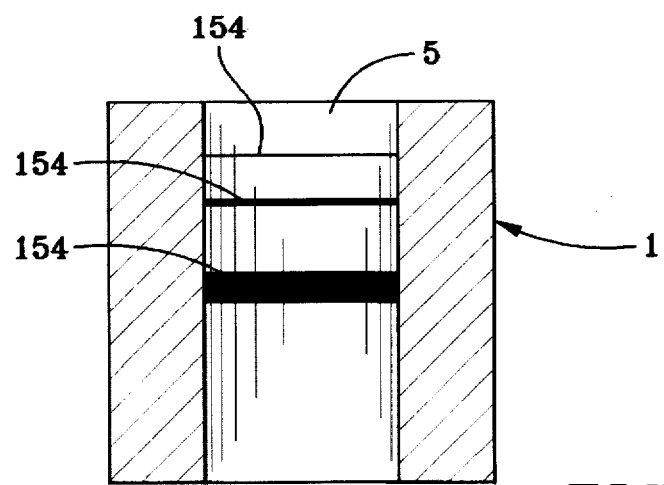
FIG. 6 is a view similar to FIG. 5 showing additional heat affected zones achieved according to the invention.

We prefer to provide control means 56 as conventional numerical computer controlled apparatus supplied by Aerotech, Incorporated, sold under the registered trademark "UNIDEX", model number 16 or model number 21. Using the operations available with the control device 56, we have successfully created various patterns of heat-affected zones on the internal bore surface 5 of small diameter bore 3. FIG. 4 illustrates a typical workpiece 1 having a small diameter (¾ inch) bore 3 therein defining surface 5 to be laser heated. FIG. 5 shows a variety of heat affected zone patterns successfully heated according to the invention. A helix advancing in a first direction along workpiece bore surface 5, has a plurality of turns 150, each turn 150 separated from adjacent turns 150. The spacing (or pitch) between turns 150 can be varied to any longitudinal dimension, down to and including zero, in which case the individual turns 150 overlap to form a continuous stretch forming an annular ring. Also, at least one additional helix advancing in a second direction along bore surface 5, second direction being opposite to first direction of first helix can be superimposed over the first helix. The turns 152 of the additional helix can be spaced apart as described for rings 150 of the first helix. Also, one or a plurality of annular, spaced-apart rings 154 (FIG. 6) can be provided.

We prefer the following type of laser: A 5 kW, CO2, continuous wave laser, with an output at 10.6 microns wavelength, such as provided by Spectra Physics, Inc., Model No. 975. Other lasers that can be used include a continuous wave YAG laser; and a pulsed CO2, YAG or excimer laser.

We prefer to operate the laser in the power range of 1.9 KW to 2.2 KW. The laser beam is focused on the surface of the substrate by a 10 inch focal length mirror 21, to cause localized heating melting of the surface 5. By varying the laser power, and speed of movement of workpiece 1, we can vary the temperature attained up to and including melting of heated area 25.

We have successfully used the invention to produce a workpiece with a hardened small ID bore having a bore under ¾ inch diameter, wall thickness of under 1/10 inch, the bore being asymmetrically machined through with abrupt diameter changes and through slots along the bore length. In conventional production techniques, the asymmetrical geometry caused significant distortion, requiring extensive post-heat-treatment grinding and machining. The laser technique of the invention applied minimum heat only to the surface 5 of bore 3, inducing so little dimensional change, that no further machining was required.

While we have shown a bore 3 extending completely through the thickness of a workpiece 1, a bore extending part way through the workpiece could be heated by providing a U-shaped stalk that entered and exited the same opening in a bore. Another alternative would be to provide a stalk entering the bore opening, with the stalk having with one passageway for cooling fluid and another passageway for a laser beam, with a mirror at the end of the second passageway to deflect the beam against the surface to be heated. Shrouding gas could be also be introduced into the bore via the stalk.

Having described the invention, what is claimed is:

1. A method for laser heating a surface formed by a circular bore extending in a workpiece along a longitudinal bore axis comprising:

a. providing a holder for holding a workpiece, said holder extending along a longitudinal workpiece holder axis and terminating in an open first end and open second end;;

b. directing a laser beam into a first end of said workpiece bore;

c. providing optic means in said workpiece bore for directing said laser beam against a portion of said surface to be heated, while simultaneously stopping any laser beam from exiting out said second end of said workpiece holder;

d. cooling said workpiece adjacent said portion of said surface to be heated;

e. moving said workpiece and said optic means relative to each other longitudinally back and forth along said workpiece bore axis;

f. rotating said workpiece about said workpiece bore axis relative to said optic means; and g. controlling movement of said workpiece and said optic means to produce a preselected pattern of heated area on said workpiece bore surface.

2. The method of claim 1 further comprising:

a. providing said holder as an elongated hollow tubular workpiece holder having an outer surface and an inner surface, said inner surface forming an enclosed passageway; and b. performing said cooling step by positioning said workpiece holder inner surface adjacent said first end in substantially continuous contact against an outer surface of said workpiece, when said workpiece is positioned in said passageway, whereby said workpiece holder rapidly cools said workpiece by conducting heat away therefrom.

3. The method of claim 2 further comprising: providing gas shielding to said portion of said workpiece surface during heating thereof.

4. The method of claim 3 further including the steps prior to directing said laser beam into said first workpiece bore comprising:

a. adjusting said laser beam into a preselected geometric configuration; and b. focusing said adjusted laser beam into a beam of preselected intensity and directing said focused laser beam into said workpiece bore along said workpiece bore axis.

5. The method of claim 4 wherein said optic means provided comprises:

a. mirror means, positioned in said workpiece bore at an angle to said workpiece bore axis, for deflecting said focused laser beam against said workpiece bore surface;

b. mirror support means for supporting said mirror means spaced from said workpiece bore surface in said workpiece bore; and said method includes the further step of cooling said mirror means and said support means.

6. The device of claim 5 wherein said workpiece cooling step further comprises:

a. providing a first jacket on said external surface of said workpiece holder, said first jacket positioned adjacent said first end of said workpiece holder and, together with said external surface, enclosing an intermediate space through, said first jacket further including an entry port and exit port; and b. circulating a cooling fluid through said first jacket intermediate space via said entry and exit ports.

7. The method of claim 6 wherein said step of gas shielding further comprises:

a. providing a second jacket on said external surface of said workpiece holder, said second jacket positioned adjacent said second end of said workpiece holder and, together with said external surface, enclosing a second intermediate space, said second jacket further including entry passageway means connecting said second intermediate space with said workpiece holder enclosed passageway;

b. circulating said shielding gas through said second intermediate space and said workpiece holder enclosed passageway;

c. providing blocking means for blocking said second open end of said workpiece holder against gas exiting therefrom;

d. providing laser light stop means in said workpiece holder enclosed passageway longitudinally positioned between said mirror means and said blocking means for stopping passage of reflected beams of laser light while permitting flow therethrough of said shielding gas; and e. providing suction means adjacent said first open end of said workpiece holder for drawing vapors, smoke and debris from heating along with said shielding inert gas in said workpiece holder passageway, across said area of said workpiece bore surface to be heated and out said first open end, whereby said area to be heated is protected from contamination during heating.

8. The method of claim 7 further including the step of cooling said optic means by circulating a cooling fluid therethrough.

9. The method of claim 8 further comprising coating said workpiece internal bore with a coating that converts a laser beam energy into heat for heating said workpiece bore surface.

10. The method of claim 9 wherein said coating step further comprises;

a. cleaning said workpiece bore surface;

b. heating said workpiece bore surface to remove moisture;

c. coating said workpiece bore surface with a liquid carrying a dispersion of absorptive particles, said particles characterized by an ability to transform energy from said laser beam into surface heating of said bore surface; and d. heating said coating to evaporate said liquid carrier.

11. The method of claim 10 wherein said shielding gas is selected from the group consisting essentially of argon, neon, xenon, helium and nitrogen.

12. The method of claim 11 wherein said cooling fluid in said first jacket and said optic means is water.

13. The method of claim 12 wherein said longitudinal and rotational movement is controlled to produce said heated area pattern as a helix longitudinally along said workpiece bore surface, said helix having a plurality of turns, each turn separated from adjacent turns.

14. The method of claim 13 wherein said longitudinal and rotational movement is controlled to produce said heated area pattern as an annular band on said workpiece bore surface.

\* \* \* \* \*